United States Patent [19]

Thut

[11] 4,142,330
[45] Mar. 6, 1979

[54] THREAD GRINDING MACHINE

[75] Inventor: Kurt Thut, Schnottwil, Switzerland
[73] Assignee: Osterwalder AG, Switzerland
[21] Appl. No.: 855,005
[22] Filed: Nov. 25, 1977
[30] Foreign Application Priority Data
  Dec. 16, 1976 [DE] Fed. Rep. of Germany ....... 2657133
[51] Int. Cl.² ............................................. B24B 5/10
[52] U.S. Cl. ................... 51/95 TG; 90/11.62
[58] Field of Search ............ 51/95 TG, 95 LH, 95 R, 51/232, 288; 90/11.62; 82/5; 408/65; 10/129 R, 139 WH, 129 WH

[56] References Cited

U.S. PATENT DOCUMENTS

| | | | |
|---|---|---|---|
| 1,750,956 | 3/1930 | Flanders | 51/95 TG X |
| 3,337,996 | 8/1967 | Stade | 51/95 TG |
| 3,538,647 | 11/1970 | Woloszyn | 51/95 TG |

Primary Examiner—Nicholas P. Godici
Attorney, Agent, or Firm—Gordon W. Hueschen

[57] ABSTRACT

A thread grinding machine comprising a headstock movable to-and-fro upon a machine frame. This to-and-fro movement is generated by a threaded rod driven by a spindle and transmission means and a rod member pivotably mounted at one end in a fixed adjustment arm of the headstock and at the other end guided to be axially and pivotably movable at the threaded rod. The rod member is also guided to be axially displaceable in a guide element pivotably mounted in a bearing block adjustably connected with the machine frame. A control device reverses the direction of rotation of the driven spindle.

13 Claims, 4 Drawing Figures

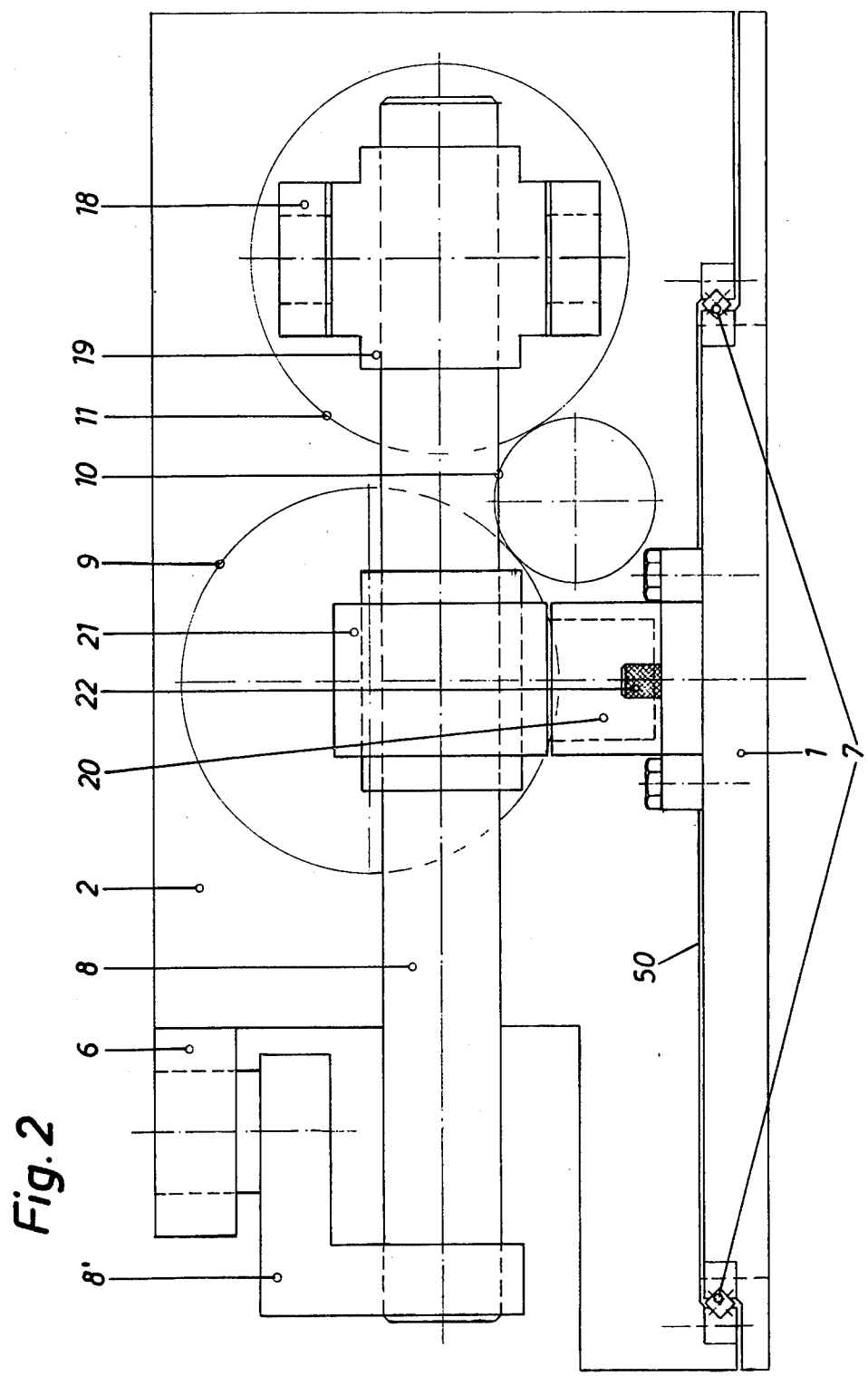

THREAD GRINDING MACHINE

BACKGROUND OF THE INVENTION

The present invention relates to a new and improved construction of a thread grinding machine for grinding short threads by means of a plunge-cut technique and for face or cone grinding, wherein the to-and-fro movement of the tool headstock needed for thread grinding is generated by a threaded rod and a lever, there also being provided a coupling which enables interrupting this movement for the face and cone grinding, so that the tool headstock remains stationary in its position, the coupling and its control being structured such that the coupling and uncoupling always is carried out in the same exact position of both the workpiece headstock and also the workpiece spindle.

With the heretofore known thread grinding machines one is basically concerned with so-called universal grinding machines, the basic design of which is such that there can be ground threads or screws having single groove disks. Grinding of the threads is accomplished in the same manner as is conventional when cutting threads or screws upon a lathe. The grinding disk is brought into the desired position before the screw or thread to be ground and then travels through the thread, frequently pre-cut, until reaching the end thereof where it then lifts-off of the thread or screw. The direction of rotation of the workpiece is now reversed and the grinding disk returns without performing any grinding action. For the next pass the disk now is further infed or advanced by a certain amount than was the case during the last or preceding pass, the rotational direction of the workpiece again reversed and the disk again passes through the threading until reaching the end thereof, where the disk is lifted-off. These operations repeat until the thread has reached the desired depth.

It should be readily apparent that the amount of time needed for producing a thread or screw according to this technique is extremely high. The amount by which the grinding disk is infed or advanced during each pass is small and the rotational speed of the workpiece exceedingly small, so that quite a bit of time is consumed until there is performed a grinding operation during only one pass. Since there are required at least as many revolutions as there are pitches of the thread, the grinding time is long. A further loss in time prevails by virtue of the fact that the grinding disk returns without exerting any grinding action.

The manufacturers of such grinding machines then decided to construct plunge-cut grinding devices as an auxiliary device. During plunge-cut grinding the grinding disk is grooved in accordance with the thread to be ground and is wider than the latter, so that for accomplishing one pass theoretically there is required only one revolution of the workpiece. In practice, however, the workpiece rotates at somewhat more than one revolution.

Of course, the workpiece must carry out a to-and-fro movement, corresponding to the desired thread pitch. With the state-of-the-art thread grinding machines this is achieved by moving the workpiece headstock by means of a lead or guide spindle and change gears. These change gears must be exchanged when altering the pitch which is to be ground. For grinding all conventional pitches there is thus needed a large number of change gears, and it is also to be appreciated that the exchange operation is time consuming.

Additionally, there is also known a machine where the threading is ground during forward and rearward rotations. The to-and-fro movement is produced in that the workpiece spindle externally carries a threading which travels in a stationary nut and this spindle is driven by a motor and a rotational speed-varying device, the motor being reversed in polarity during each forward and reverse movement. This machine is associated with the considerable drawback that for each thread to be ground there must be available a special spindle with associated nut. This solution is exceedingly expensive, since, to avoid errors in the pitch by play and wear, there must be advantageously employed cone revolving spindles or planetary spindles.

Now oftentimes it is required of parts which are provided with threading, that at least there be available a surface or a cone, for instance, in the case of collets or chucks of automatic lathes and the like, which have as low as possible eccentric or concentricity error in relation to the threading. It is therefore advantageous to grind threading and flat surfaces or cones in a clamping device. However, this is not possible when working with either of the two above-described methods, since in this case it is necessary to interrupt the to-and-fro movement of the workpiece. Since both methods are not capable of grinding in the aforedescribed manner, when working with parts having external threading one has resorted to the technique of grinding the threading and other surfaces of the workpiece which should possess only slight concentricity errors in relation to the threading, between tips, and wherein the centers advantageously previously likewise have been ground upon a special machine. In the case of internal threads it is oftentimes necessary to grind a centering diameter at the workpiece prior to thread grinding. For the thread grinding and the inner cone grinding to be accomplished at another machine or also hole grinding, the workpiece is then clamped at this diameter. In both instances both with internal thread grinding as well as also external thread grinding the concentricity error is greater than when the thread and flat surfaces or cone are ground in a clamping device.

SUMMARY OF THE INVENTION

Hence, with the foregoing in mind it is a primary object of the present invention to provide an improved construction of thread grinding machine which is not associated with the aforementioned limitations and drawbacks of the prior art proposals.

Still a further significant object of the invention relates to a new and improved construction of thread grinding machine which is relatively simple in design, extremely reliable in operation, economical in manufacture, easy to use, not readily subject to breakdown or malfunction, and avoids the drawbacks of the heretofore-discussed prior art equipment.

Now in order to implement these and still further objects of the invention, which will become more readily apparent as the description proceeds, the to-and-fro movement is produced by means of a threaded rod and a rod member, the rod member being moved to-and-fro on the one hand by the spindle and, on the other hand, is pivotably mounted at the to-and-fro moving workpiece headstock. Further, there is provided a bearing block which is pivotably mounted at the stationary machine frame and has a bore in which there is guided the rod member. Additionally, it is proposed to displace the bearing block upon the frame at right angles to the movement of a to-and-fro moving part, so that depending upon the position of the bearing block there alters the degree of to-and-fro movement of the workpiece headstock. Since the thread pitches are standardized and thus in practice there is limited the number of pitches which are to be ground, there are provided at certain spacing from one another catch holes for the bearing block, each catch hole corresponding to a predetermined pitch. If it is necessary to also grind non-standardized or also inch threading, then it is proposed according to a further aspect of the invention, to displace the bearing block by means of a spindle, so that each pitch can be adjusted within a given band width. In both cases, the adjustment of the desired pitch is very simple and time-saving.

A further objective of the invention resides in affording the possibility of being able to grind in a clamping device the threading at the workpiece and at least one surface or cone, the latter especially during grinding of internal threads. Hence, it is a further proposal of the invention to install a coupling between the workpiece spindle and the threaded rod for producing the to-and-fro movement, the coupling being controlled in a manner such that for the flat grinding or cone grinding the drive gear for the threaded rod is uncoupled, and accordingly, the workpiece spindle does not experience any to-and-fro movement during its rotational movement.

In the case of parts, where the threading must be pre-cut, this device is not per se sufficient. In addition, firstly, the start of the threading must be marked at the workpiece and, secondly, the control of the workpiece spindle must function in a manner such that the spindle stops after the finish grinding of the threading and also the flat or cone surface must always stop at the same location. In this way, it is possible to grind a number of similar workpieces without changing the basic setting of the machine.

In order to solve this objective, the invention proposes that the workpeice spindle carries a cam which, during each revolution, travels past a stationary signal transmitter. The signal transmitter can function electrically, pneumatically or also in a different manner. Normally, the workpiece turns more than one revolution during the thread grinding operation, and the over-run beyond 360° can be of a different magnitude, depending on the size of the threading which is to be ground.

According to the invention, a second cam is therefore provided which is likewise attached to the spindle or to another part which travels in synchronism with the spindle and which likewise moves past a contact transmitter. This second cam, in contrast to the first cam, is displaceable at the periphery of the part to which it is connected, so that there can be adjusted any random angle.

With a thread grinding machine according to the invention the threads can be ground more rapidly, and additionally there prevails the possibility of co-grinding flat surfaces and cones or also other surfaces in the same workpiece clamping device.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side view of the workpiece headstock shown in FIG. 1, again partially in sectional view;

DETAILED DESCRIPTION OF THE PREFERRED EMBODIMENTS

Figure 1:
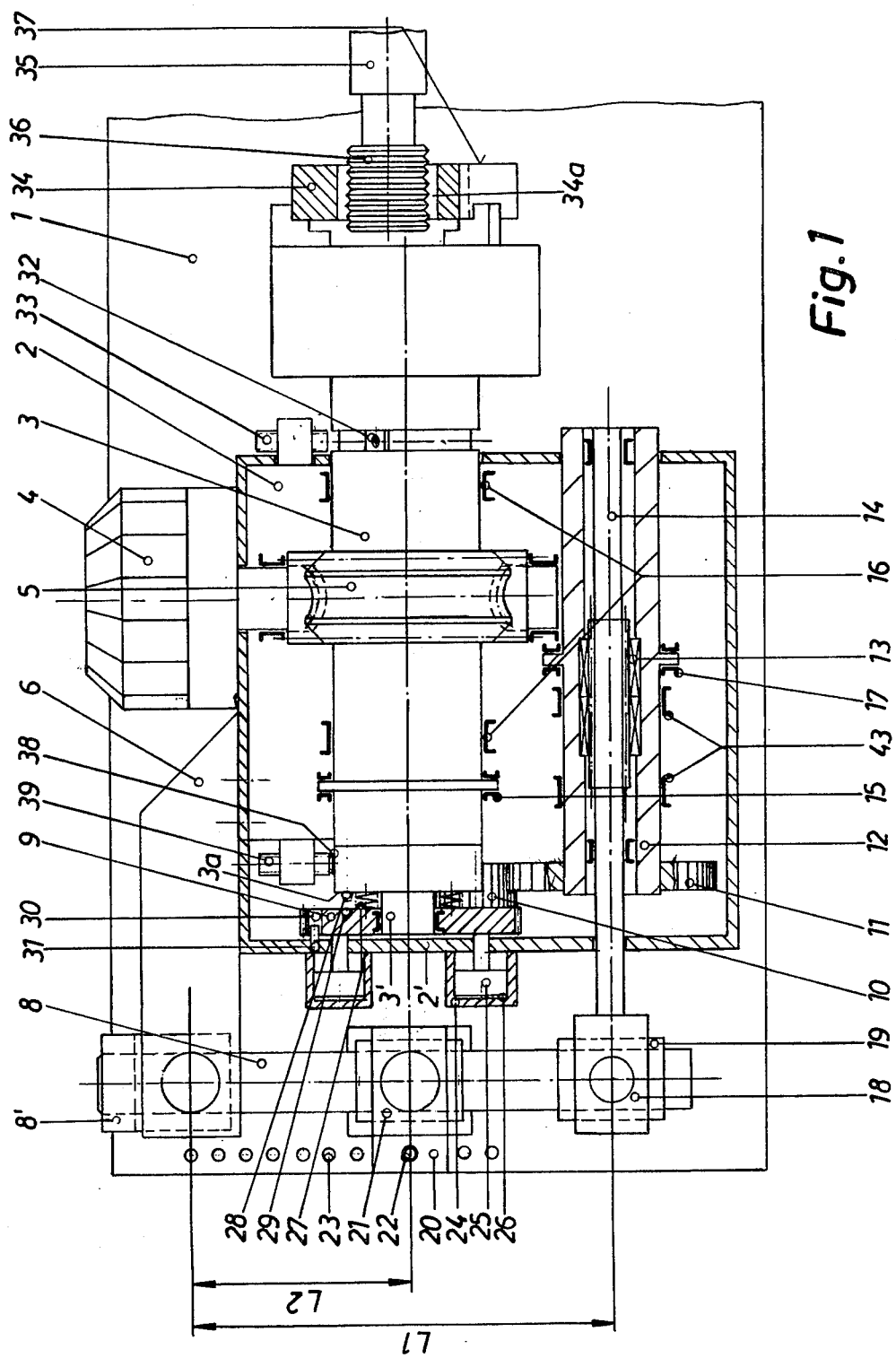
FIG. 1 is a top plan view, partially in section, of a workpiece headstock of a thread grinding machine constructed according to the present invention.

Describing now the drawings, the thread grinding machine illustrated by way of example therein, will be seen to comprise firstly a machine frame 1, a workpiece headstock 2 and a spindle 3 which is placed into rotation by a drive motor 4 with the aid of gearing 5. At the headstock 2 there is secured an arm 6 in which there is pivotably mounted about a vertical axis a rod member 8 by means of an angle element or angle piece 8'. At one end of the spindle 3 there is arranged to be rotatable and axially displaceable upon a pin 3' a coupling gear 9. The coupling gear 9 meshes with an intermediate gear 10 and such in turn meshes with a gear 11 which is rigidly connected with a bushing 12 extending parallel to the spindle 3 and mounted upon the headstock 2. A nut or nut member 13 is fixedly connected with the bushing or sleeve 12 and a threaded rod 14 is guided through the nut 13. The spindle 3 and the bushing 12 are retained to be rotatable but axially non-displaceable in the bearings 15, 16 and 17, 43 respectively. The threaded rod 14 is provided at one end with a bifurcated or forked element 18 in which there is pivotably mounted a guide member 19. In the guide member or element 19 there is axially displaceably guided the rod member 8. Further, there is provided a bearing block 20 in which there is pivotably mounted about a vertical axis a further guide element 21. The rod member 8 is likewise axially displaceably guided in the guide element 21. The bearing block 20, which is displaceable upon the machine frame 1 at right angles to the axis of the spindle 3 upon the guide means 50 (FIG. 2), and can be positionally fixed however in any position by means of any conventional fixing device, such as for instance locking elements, bolts or the adjustment device 40 to 42 of FIG. 4, carries at least one catch pin 22. Catch holes or apertures 23 are arranged at a suitable spacing from one another at the frame 1, each catch hole 23 being correlated to a certain thread pitch.

Two or more cylinders 24 with associated pistons 25 and pressure chambers or compartments 26 are fixedly connected with the headstock 2. Of course, the contemplated function also can be fulfilled by a rotary piston. Now if the pressure compartments or chambers 26 have applied thereto a pressurized fluid medium, then the pistons 25 displace the coupling gear 9 against a shoulder 3a of the spindle 3. By means of a cam 38 and a signal transmitter 39, which is connected with the headstock 2, the spindle 3 is retained by the machine control in such a position that the pin 28 arranged at the shoulder 3a of the spindle 3 is introduced into the bore 29 of the coupling gear 9. At the same time the holder bore 30 in the coupling gear 9 and the holder pin 31 which is fixed at the headstock 2 are separated from one another. As soon as the pressure in the pressure compartments or chambers 26 has been turned-off, then the springs 27 push the coupling gear 9 against the wall 2' of the headstock 2 where it is prevented by the holder pin 31 from entrainably revolving with the spindle 3. A further cam 32 is provided at the spindle 3, cam 32 being fixedly positionable by a cam positioning-adjustment and fixing element 60 at any desired location at the periphery of the spindle 3. Also a signal transmitter 33 coacting with the cam 32 is provided. The signal transmitter 33 is fixedly connected with the headstock 2. This headstock 2 is displaceable upon longitudinal guides 7 (FIG. 2) upon the machine frame 1. In the drawing there has been shown by way of example a workpiece 34 at which there is to be machined internal threading, as well as a grinding spindle 35 having a profiled grinding disk 36.

At the start of the working operation the grinding disk 36 is introduced into the workpiece 34. The pressure chambers or compartments 26 are impinged with the pressurized fluid medium, so that the coupling gear 9 is connected by the bore 29 and the pin 28 with the spindle 3. As soon as the grinding disk 36 has obtained the desired position in the workpiece bore 34a, then the spindle 3 is placed into rotation by the motor 4 and the gearing 5. The coupling gear 9 now drives by means of the intermediate gear 10 and the gear 11 the bushing 12. In the embodiment under discussion the transmission ratio between the coupling gear 9 and the gear 11 amounts to 1:1. Of course it can be a different ratio. Due to the rotation of the bushing 12 and the therewith connected nut or nut member 13 the threaded rod 14 is horizontally displaced. The rod member 8 pivots about the axis of rotation at the guide element 21 and displaces the headstock 2, by means of the arm 6 articulated at the rod member 8, in a direction opposite the threaded rod 14, and specifically in the relationship of the lengths L2-L1 (FIG. 1). In the depicted embodiment the bearing block 20 is located exactly in the center between the pivot axis of the rotatable element 19 and that of the arm 6, so that the headstock 2 moves through one half of the distance of the pitch of the threaded rod 14. After approximately slightly more than one revolution of the spindle 3, when the cam 32 travels a second time over the signal transmitter 33, the direction of rotation of the motor 4 is reversed and the grinding disk 36 is advanced by a predetermined amount. The spindle 3 now rotates in the opposite direction back into the starting position until the cam 38 moves past the signal transmitter 39. The rotational sense is now again reversed and the grinding disk 36 is again infed or advanced by a predetermined amount. These operations repeat until the threading has reached the desired thread depth, and the spindle 3 is retained by the motor 4 in the position where the cam 38 is located below the signal transmitter 39. The grinding disk 36 is lifted-off and the non-illustrated grinding headstock travels together with the grinding spindle 35 and the grinding disk 36 out of the workpiece 34.

Now if there should be also ground at the workpiece 34 the flat or planar surface 37, then a not particularly illustrated surface grinding device which is conventionally employed for hole grinding machines is brought into its grinding position. For flat grinding, the spindle 3 of course must be axially stationary during its rotational movement. The pressure chambers or compartments 26 are emptied and the springs 27 press the coupling gear 9 against the housing wall of the headstock 2 where the holder pin 31 retains the coupling gear 9 in its position by means of the bore 30. The drive motor 4 now is brought to the desired rotational speed and the planar or flat surface 37 is ground in conventional manner as is known from hole or bore grinding machines. After the finish grinding the motor 4 is controlled such that the spindle 3 is stationary in that position where the cam 38 is located below the signal transmitter 39. For thread grinding the next part the pressure compartments 26 are again impinged with the pressurized fluid medium, so that the coupling gear 9 again is pressed against the spindle 3 and the pin 28 moves into the bore 29 and thus couples the coupling gear 9 with the spindle 3.

Of course, with a thread grinding machine upon which there should be ground a cone or other surfaces, the coupling gear 9 can be fixedly connected with the spindle 3, in which case then there can be dispensed with the use of the elements 24-31.

Figure 4:
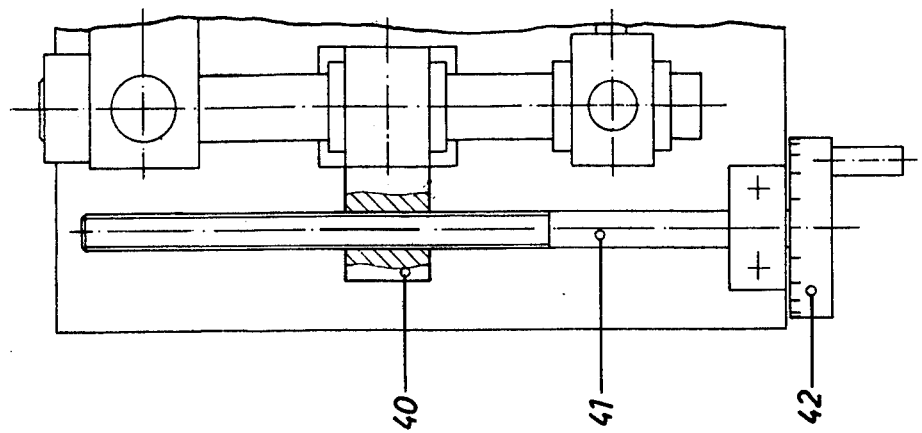
FIG. 4 is a top plan view of the adjustment device for adjusting the thread pitch by means of the spindle and reader device.
Figure 3:
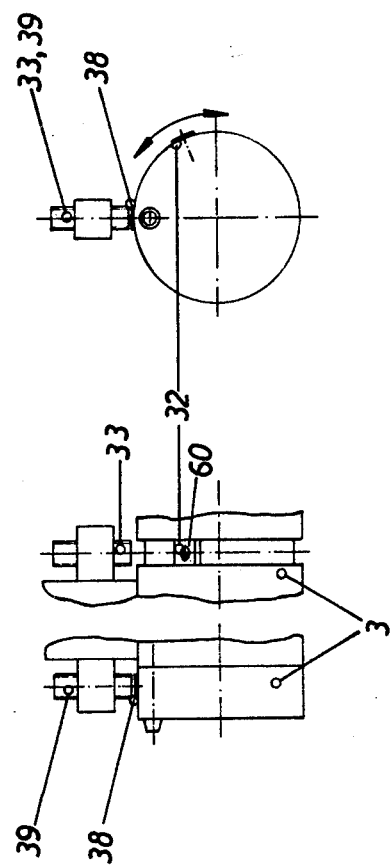
FIG. 3 is a purely schematic illustration of the control cams with the associated signal transmitters.

Finally, FIG. 4 illustrates an adjustment device for the bearing block 20 which enables adjusting each desired pitch within the adjustment range. To this end there is provided in the bearing block 20 a nut or nut member 40 in which there is guided an adjustment spindle 41. The adjustment spindle 41 is rotatably mounted but axially non-displaceable at the frame 1. Further, there is provided a handwheel 42 by means of which there can be rotated the adjustment spindle 41 and which is constructed such that there can be read-off a suitable vernier or scale the pitch. Of course, other reading devices can be employed, such as a mechanical counter which is driven by the spindle, or digital and analogue measuring systems.

While there are shown and described present preferred embodiments of the invention, it is to be distinctly understood that the invention is not limited thereto, but may be otherwise variously embodied and practiced within the scope of the following claims.

Accordingly,

What is claimed is:

1. A thread grinding machine for machining a workpiece comprising:
   a machine frame;
   a headstock;
   means mounting said headstock for to-and-fro movement at the machine frame;
   means for imparting to-and-fro movement to the headstock;
   said to-and-fro movement imparting means comprising:
   a threaded rod;
   a spindle and transmission means for driving said threaded rod;
   an adjustment arm carried by the headstock;
   a rod member having opposed ends;
   means pivotably mounting one end of said rod member at the adjustment arm of the headstock;
   means guiding the other end of said rod member to be axially and pivotably movable in said threaded rod;
   a guide element;
   a bearing block adjustably connected with the machine frame;
   said guide element being pivotably mounted in said bearing block;
   said rod member being guided for axial displacement in said guide element;
   means for driving said spindle;
   a control device for reversing the rotational direction of the driven spindle.

2. The thread grinding machine as defined in claim 1, wherein:
    said transmission means comprises a gear drive and a bushing equipped with a nut member.

3. The thread grinding machine as defined in claim 1, including:
    guide means for mounting said bearing block upon the machine frame to be displaceable perpendicular to the lengthwise axis of said spindle; and
    means for fixing the bearing block in each displaced position.

4. The thread grinding machine as defined in claim 3, further including:
    at least one catch pin carried by said bearing block;
    said machine frame being provided with catch holes arranged at said machine frame at a predetermined spacing from one another corresponding to the desired workpiece-thread pitch;
    said catch pin being selectively engageable with said catch holes.

5. The thread grinding machine as defined in claim 3, wherein:
    said fixing means includes an adjustment spindle for the infinite adjustment of said bearing block.

6. The thread grinding machine as defined in claim 2, further including:
    selectively connectable and disconnectable coupling means provided at the gear drive between the spindle and the bushing.

7. The thread grinding machine as defined in claim 6, wherein:
    said gear drive comprises a number of gears;
    means for selectively engaging and disengaging one of said gears of said gear drive.

8. The thread grinding machine as defined in claim 1, wherein said control device comprises:
    two cams operatively associated with said spindle;
    two signal transmitters cooperating with said two cams provided at said headstock;
    said signal transmitters delivering signals which are capable of reversing the direction of rotation of the spindle.

9. The thread grinding machine as defined in claim 8, wherein:
    said two cams are arranged at said spindle.

10. The thread grinding machine is defined in claim 8, wherein:
    said two cams are arranged at a part moving in synchronism with said spindle.

11. The thread grinding machine as defined in claim 8, wherein:
    at least one of the cams is fixedly connected with said spindle;
    said driving means for said spindle comprising a drive motor controlled by the associated signal transmitter of said one cam such that the spindle always comes to rest at the same position upon stopping thereof.

12. The thread grinding machine as defined in claim 8, further including:
    means mounting at least one of said cams so as to be peripherally displaceable and fixable in each selectively displaced position.

13. The thread grinding machine as defined in claim 6, further including:
    holder means provided at said machine frame for fixedly positioning said bushing at the moment of uncoupling of said coupling means.

* * * * *